(12) United States Patent
Iyoda (10) Patent No.: US 8,855,865 B2
(45) Date of Patent: Oct. 7, 2014

(54) COLLISION DETERMINATION DEVICE, COLLISION DETERMINATION METHOD, AND OCCUPANT PROTECTION DEVICE

(75) Inventor: Motomi Iyoda, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 355 days.

(21) Appl. No.: 12/676,544

(22) PCT Filed: Oct. 2, 2008

(86) PCT No.: PCT/IB2008/002591
§ 371 (c)(1),
(2), (4) Date: Mar. 4, 2010

(87) PCT Pub. No.: WO2009/044259
PCT Pub. Date: Apr. 9, 2009

(65) Prior Publication Data
US 2010/0211251 A1 Aug. 19, 2010

(30) Foreign Application Priority Data
Oct. 4, 2007 (JP) .................. 2007-260834

(51) Int. Cl.
*B60R 21/0136* (2006.01)
*B60R 21/00* (2006.01)
*B60R 21/0132* (2006.01)

(52) U.S. Cl.
CPC ..... *B60R 21/0136* (2013.01); *B60R 2021/0006* (2013.01); *B60R 21/0132* (2013.01)
USPC ......................................... 701/45; 280/730.2

(58) Field of Classification Search
USPC .......................................... 280/730.2; 701/45
See application file for complete search history.

(56) References Cited

U.S. PATENT DOCUMENTS

| | | | | |
|---|---|---|---|---|
| 5,338,062 | A | * 8/1994 | Kiuchi et al. | ................. 280/735 |
| 5,390,951 | A | 2/1995 | Iyoda | |
| 5,538,099 | A | * 7/1996 | Blackburn et al. | ............ 180/282 |
| 5,544,716 | A | 8/1996 | White | |

(Continued)

FOREIGN PATENT DOCUMENTS

| | | |
|---|---|---|
| DE | 195 37 350 | 4/1996 |
| DE | 101 52 492 | 5/2002 |

(Continued)

OTHER PUBLICATIONS

Chinese Office Action issued Feb. 24, 2011, in Patent Application No. 200880007893.5 (with English-language translation).

*Primary Examiner* — Keith Frisby
(74) *Attorney, Agent, or Firm* — Oblon, Spivak, McClelland, Maier & Neustadt, L.L.P.

(57) ABSTRACT

A collision determination device for determining a collision occurrence against a door part of a vehicle has: a door acceleration detector that detects an acceleration generated on the door part of the vehicle and a direction of the acceleration; and a collision determination part that determines that a collision has occurred against the door part from the outside, when the direction of the acceleration detected by the door acceleration detector is a closing direction of the door part, and determines that no collision has occurred against the door part from the outside, when the direction of the acceleration detected by the door acceleration detector is an opening direction of the door part.

12 Claims, 10 Drawing Sheets

(56) References Cited

U.S. PATENT DOCUMENTS

| | | | |
|---|---|---|---|
| 5,544,915 A * | 8/1996 | Fendt et al. | 280/735 |
| 5,609,358 A * | 3/1997 | Iyoda et al. | 280/735 |
| 5,740,041 A * | 4/1998 | Iyoda | 701/45 |
| 5,758,899 A * | 6/1998 | Foo et al. | 280/730.2 |
| 5,793,005 A | 8/1998 | Kato | |
| 5,904,730 A * | 5/1999 | Yamazaki et al. | 701/301 |
| 6,095,554 A * | 8/2000 | Foo et al. | 280/735 |
| 6,157,880 A * | 12/2000 | de Mersseman et al. | 701/45 |
| 6,553,295 B1 | 4/2003 | Bauch et al. | |

FOREIGN PATENT DOCUMENTS

| | | |
|---|---|---|
| EP | 0 576 018 | 12/1993 |
| JP | 6-219237 | 8/1994 |
| JP | 2007 510134 | 4/2007 |
| JP | 2007 137332 | 6/2007 |

\* cited by examiner

COLLISION DETERMINATION DEVICE, COLLISION DETERMINATION METHOD, AND OCCUPANT PROTECTION DEVICE

BACKGROUND OF THE INVENTION

1. Field of the Invention

This invention relates to a collision determination device, a collision determination method, and an occupant protection device. More particularly, this invention relates to a collision determination device, collision determination method, and occupant protection device that reliably determine the occurrence of a collision against a door part from the outside and prevent erroneous determination on the occurrence of a collision against the door part from the outside.

2. Description of the Related Art

In recent years, there has been proposed an occupant crash protection device for vehicles which determines occurrence of a collision against a door part of a vehicle from the outside and actuates a side airbag upon a determination that a collision has occurred, to protect an occupant (see Japanese Patent Application Publication No. 2007-137332 (JP-A-2007-137332), for example). This occupant crash protection device for vehicle determines that a collision has occurred against the door part of the vehicle from the outside, when a pressure sensor provided on the door part of the vehicle detects a change in pressure inside the door part.

However, although the above-described occupant crash protection device for vehicle detects a change in pressure inside the door part that is deformed due to the collision from the outside, the occupant crash protection device cannot detect a change in pressure if the outside collision does not deform the door part. For this reason, collision determination cannot be performed reliably.

Therefore, a technology that is capable of determining the occurrence of a collision even when the outside collision does not deform the door part is available (see Published Japanese Translation of PCT Application No. 2007-510134 (JP-A-2007-510134), for example). According to this technology, when an acceleration sensor integrated with a door part of a vehicle detects an acceleration that is equal to or greater than an acceleration generated by opening and closing the door part, it is determined that a collision has occurred against the door part of the vehicle from the outside.

However, when the door part is closed with strong force, the above-described technology detects the acceleration that is equal to or greater than an acceleration generated by opening and closing the door part. Therefore, this technology erroneously determines the occurrence of a collision against the door part from the outside, even when the door part was simply closed with strong force. As a result, the side airbag is actuated erroneously.

SUMMARY OF THE INVENTION

This invention provides a collision determination device, collision determination method, and occupant protection device that reliably determine the occurrence of a collision against a door part from the outside and prevent erroneous determination on the occurrence of a collision against the door part from the outside.

A first aspect of this invention relates to a collision determination device for determining the occurrence of a collision against a door part of a vehicle. This collision determination device has: a door acceleration detector that detects an acceleration generated on a door part of a vehicle and a direction of the acceleration; and a collision determination part that determines that a collision has occurred against the door part from the outside, when the direction of the acceleration detected by the door acceleration detector is a closing direction of the door part, and determines that no collision has occurred against the door part from the outside, when the direction of the acceleration detected by the door acceleration detector is an opening direction of the door part.

In the above aspect, the collision determination part may determine that the direction of the acceleration is the opening direction of the door part, when a polarity of a value that is obtained by integrating the acceleration detected by the door acceleration detector for a predetermined period of time is inverted relative to a polarity of an acceleration obtained when a collision has occurred against the door part from the outside.

In the above aspect, the collision determination part may determine that the direction of the acceleration is the opening direction of the door part, when a polarity of a peak value of the acceleration detected by the door acceleration detector is inverted relative to a polarity of a peak value of an acceleration obtained when a collision has occurred against the door part from the outside.

The collision determination device described above further has a pillar acceleration detector that detects an acceleration generated on a pillar part of the vehicle adjacent to the door part and a direction of the acceleration generated on the pillar part, wherein the collision determination part may determine that the direction of the acceleration is the opening direction of the door part, when a polarity of the acceleration detected by the door acceleration detector is inverted relative to a polarity of the acceleration detected by the pillar acceleration detector.

In the above aspect, the collision determination part may not perform collision determination for determining the occurrence of a collision against the door part, when a lock of the door part of the vehicle is released.

In the above aspect, the door acceleration detector may output a value obtained by reducing an acceleration acting in the closing direction of the door part.

A second aspect of the present invention relates to an occupant protection device for a vehicle, which protects an occupant from a collision against a door part of a vehicle from the outside. This occupant protection device has: an occupant protection part that protects the occupant of the vehicle; a door acceleration detector that detects an acceleration generated on the door part and a direction of the acceleration; a collision determination part that determines that a collision has occurred against the door part from the outside, when the direction of the acceleration detected by the door acceleration detector is a closing direction of the door part, and determines that no collision has occurred against the door part, from the outside when the direction of the acceleration detected by the door acceleration detector is an opening direction of the door part; and an occupant protection actuation prohibiting part that prohibits actuation of the occupant protection part when the collision determination part determines that no collision has occurred against the door part from the outside.

In the above aspect, the collision determination part may determine that the direction of the acceleration is the opening direction of the door part, when a polarity of a value that is obtained by integrating the acceleration detected by the door acceleration detector for a predetermined period of time is inverted relative to a polarity of an acceleration obtained when a collision has occurred against the door part from the outside.

In the above aspect, the collision determination part may determine that the direction of the acceleration is the opening direction of the door part, when a polarity of a peak value of the acceleration detected by the door acceleration detector is inverted relative to a polarity of a peak value of the acceleration obtained when a collision has occurred against the door part from the outside.

Furthermore, the occupant protection device described above further has a pillar acceleration detector that detects an acceleration generated on a pillar part of the vehicle adjacent to the door part and a direction of the acceleration generated on the pillar part, wherein the collision determination part may determine that the direction of the acceleration detected by the door acceleration detector is the opening direction of the door part, when a polarity of the acceleration detected by the door acceleration detector is inverted relative to a polarity of the acceleration detected by the pillar acceleration detector.

In the above aspect, the collision determination part may not perform collision determination for determining the occurrence of a collision against the door part, when a lock of the door part of the vehicle is released.

In the above aspect, the door acceleration detector may output a value obtained by reducing an acceleration acting in the closing direction of the door part by suppressing the acceleration.

A third aspect of this invention relates to a collision determination method for determining occurrence of a collision against a door part of a vehicle. This collision determination method includes: detecting an acceleration generated on the door part and a direction of the acceleration; and determining that a collision has occurred against the door part from the outside when the direction of the detected acceleration is a closing direction of the door part, and that no collision has occurred against the door part from the outside when the direction of the detected acceleration is an opening direction of the door part.

As described above, this invention can provide the collision determination device, collision determination method, and occupant protection device, which reliably determine the occurrence of a collision against a door part from the outside and prevent erroneous determination on the occurrence of a collision against the door part from the outside.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a collision determination device according to a first embodiment of the invention and an occupant protection device are described in detail with reference to the drawings.

Figure 1:
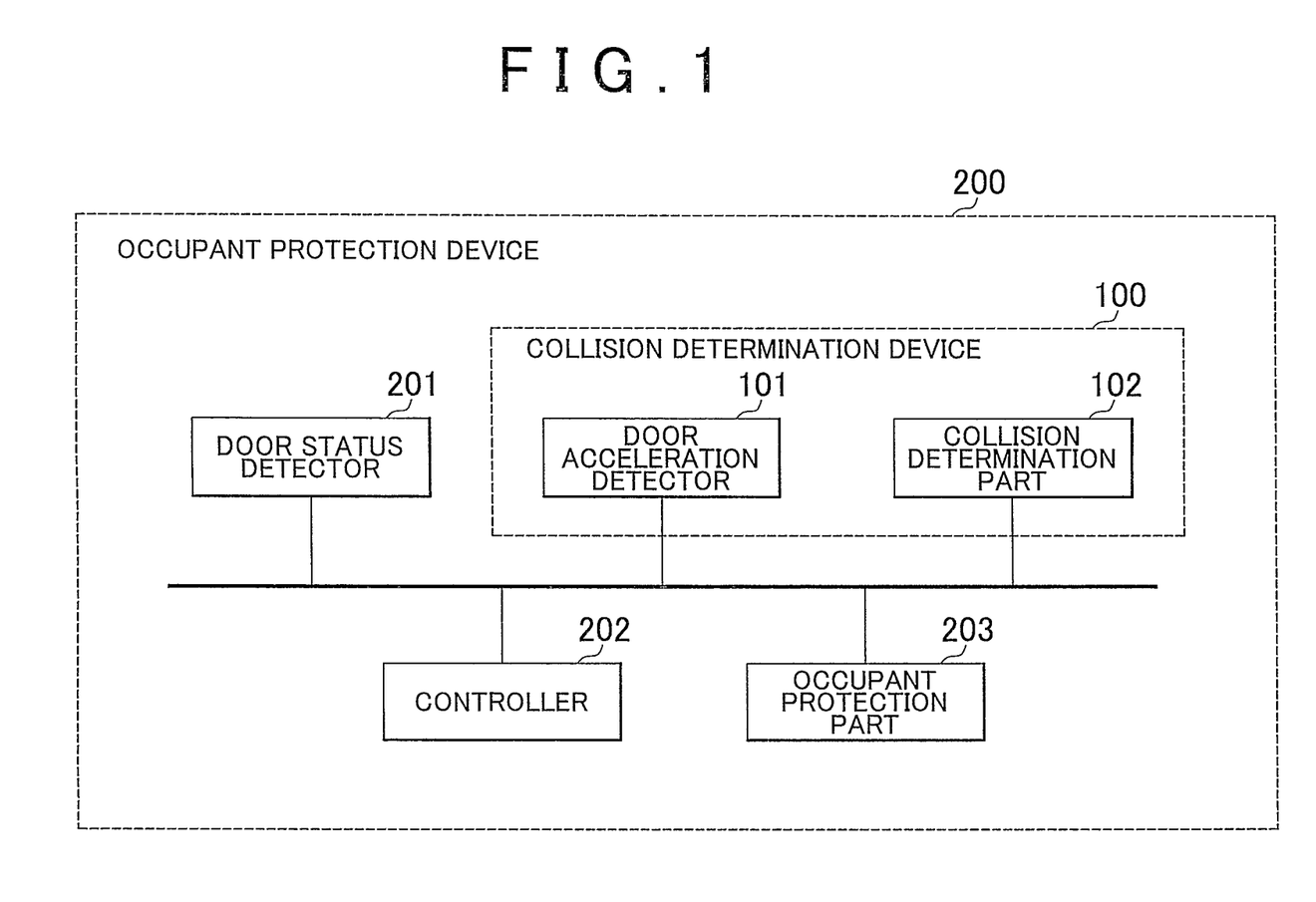
FIG. 1 is a block diagram showing the entire configuration of an occupant protection device to which a collision determination device according to a first embodiment of the invention is applied.

FIG. 1 is a block diagram showing the entire configuration of the occupant protection device to which the collision determination device according to the first embodiment of the invention is applied. In FIG. 1, an occupant protection device 200 has a collision determination device 100, a door status detector 201, a controller 202, and an occupant protection part 203. The collision determination device 100 has a door acceleration detector 101 and a collision determination part 102.

The door acceleration detector 101 is an acceleration sensor that is, for example, integrated with a door part of a vehicle and detects an acceleration generated on the door part of the vehicle and a direction of the acceleration. By integrating the door acceleration detector 101 with the door part of the vehicle, it is possible to reliably determine that a collision has occurred against the door part of the vehicle from the outside.

The collision determination part 102 determines that a collision has occurred against the door part from the outside, when the direction of the acceleration of a predetermined value or more, which is detected by the door acceleration detector 101, is a closing direction of the door part, i.e., a direction of an acceleration that should be generated in a direction of a collision caused by the outside against the door part.

The collision determination part 102 also determines that no collision has occurred against the door part from the outside, when the direction of the acceleration of the predetermined value or more, which is detected by the door acceleration detector 101, is an opening direction of the door part, i.e., a direction inverted relative to the direction of a collision against the door part from the outside.

The door status detector 201 is, for example, a door switch for detecting an open/closed state of a door. The controller 202 is an electronic control unit (ECU) for controlling the actuation of the occupant protection part 203 (e.g., a side airbag) based on the result of collision determination performed by the collision determination device 100.

Figure 2:
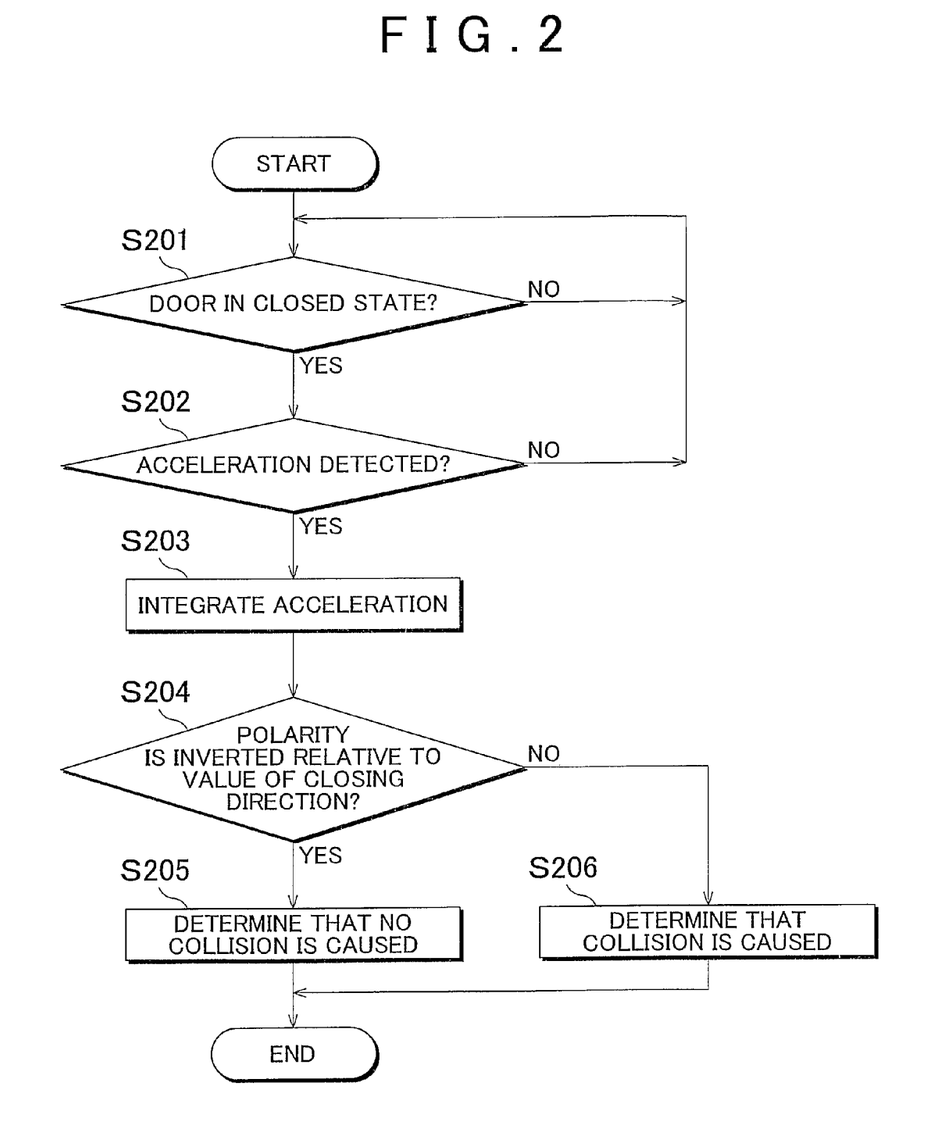
FIG. 2 is a flowchart showing the operations of the collision determination device and the occupant protection device according to the first embodiment of the invention.

Hereinafter, the operations of the collision determination device 100 and occupant protection device 200 are described with reference to the flowchart shown in FIG. 2.

First, the door status detector 201 determines whether the door part is in the closed state (step S201). Here, when the door switch is ON it is determined that the door part is in the closed state, and when the door switch is OFF it is determined that the door part is in the open state.

When it is determined in step S201 that the door part is not in the closed state, the door status detector 201 awaits there.

When, on the other hand, it is determined in step S201 that the door part is in the closed state, the collision determination part 102 determines whether the door acceleration detector 101 detects an acceleration of a predetermined value or more (step S202). The predetermined value here is a value of an acceleration that is normally generated on the door part when, for example, opening or closing the door part. When the acceleration of the predetermined value or more is generated, it means either the door part is closed with strong force or a collision has occurred against the door part from the outside.

When it is determined in step S202 that the acceleration of the predetermined value or more is not detected, the collision determination part 102 awaits there.

When, on the other hand, it is determined in step S202 that the acceleration of the predetermined value or more is detected, the collision determination part 102 integrates the value of the acceleration of the predetermined value or more, which is detected by the door acceleration detector 101, for a predetermined period of time (step S203).

Next, the collision determination part 102 determines whether a polarity of the speed that is obtained from the integration in step S203 and generated on the door part is inverted relative to a polarity of the speed generated in the closing direction of the door part, i.e., a direction in which the speed should be normally generated when a collision has occurred against the door part from the outside (step S204).

Figure 3:
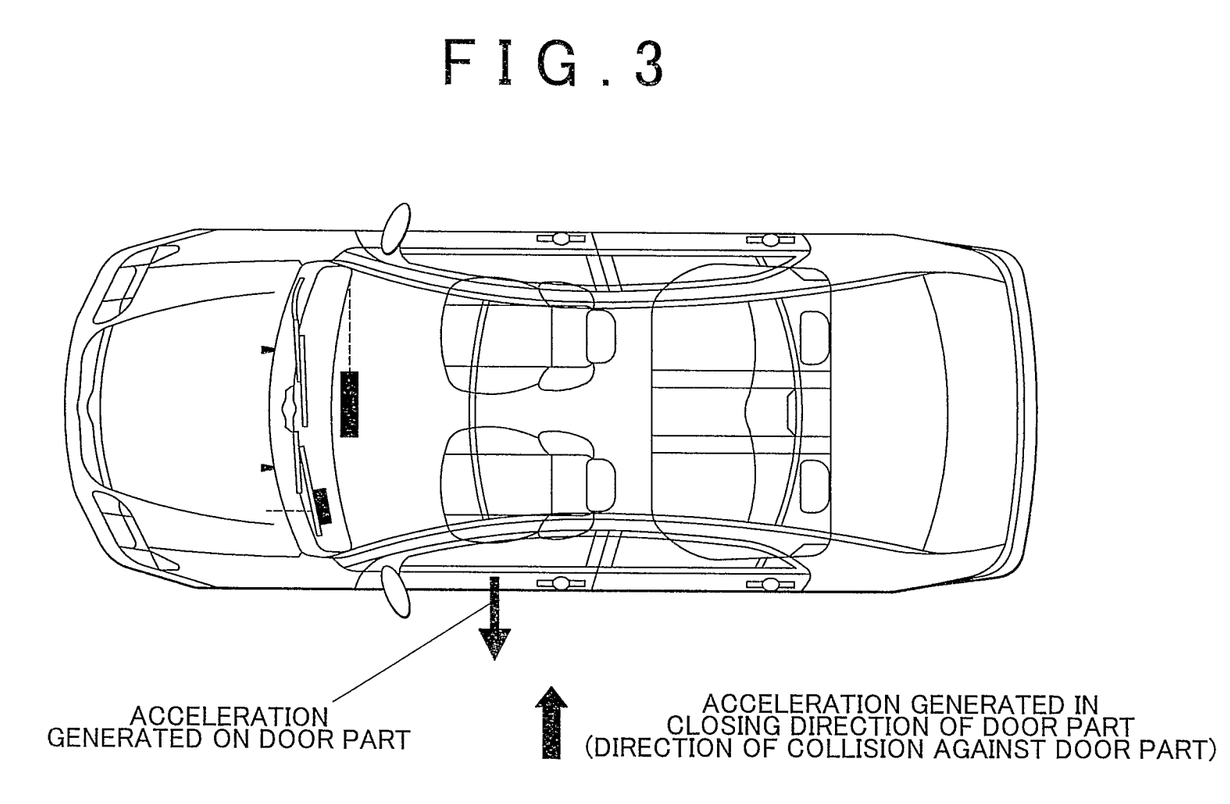
FIG. 3 is a schematic diagram showing an acceleration generated on a door part and an acceleration that should be generated when a collision occurs against the door part.
Figure 4:
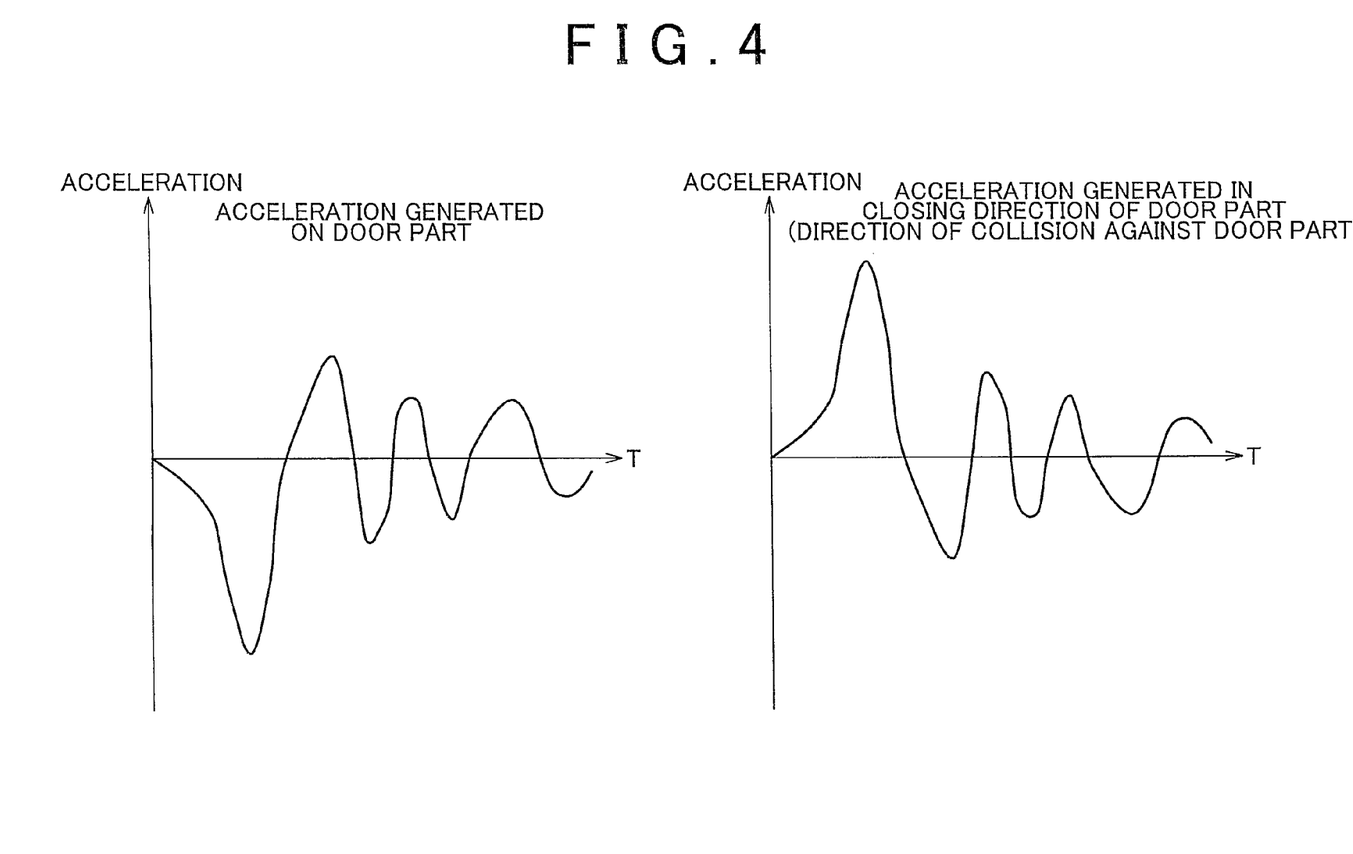
FIG. 4 is a graph showing an acceleration generated on the door part and an acceleration that should be generated when a collision occurs against the door part.

When it is determined in step S204 that the polarity is inverted, the collision determination part 102 determines that no collision is generated against the door part from the outside (step S205). At this moment, the direction of the acceleration generated on the door part is a direction that is inverted relative to the closing direction of the door part, i.e., the direction of a collision against the door part from the outside, as shown in FIGS. 3 and 4.

Figure 5:
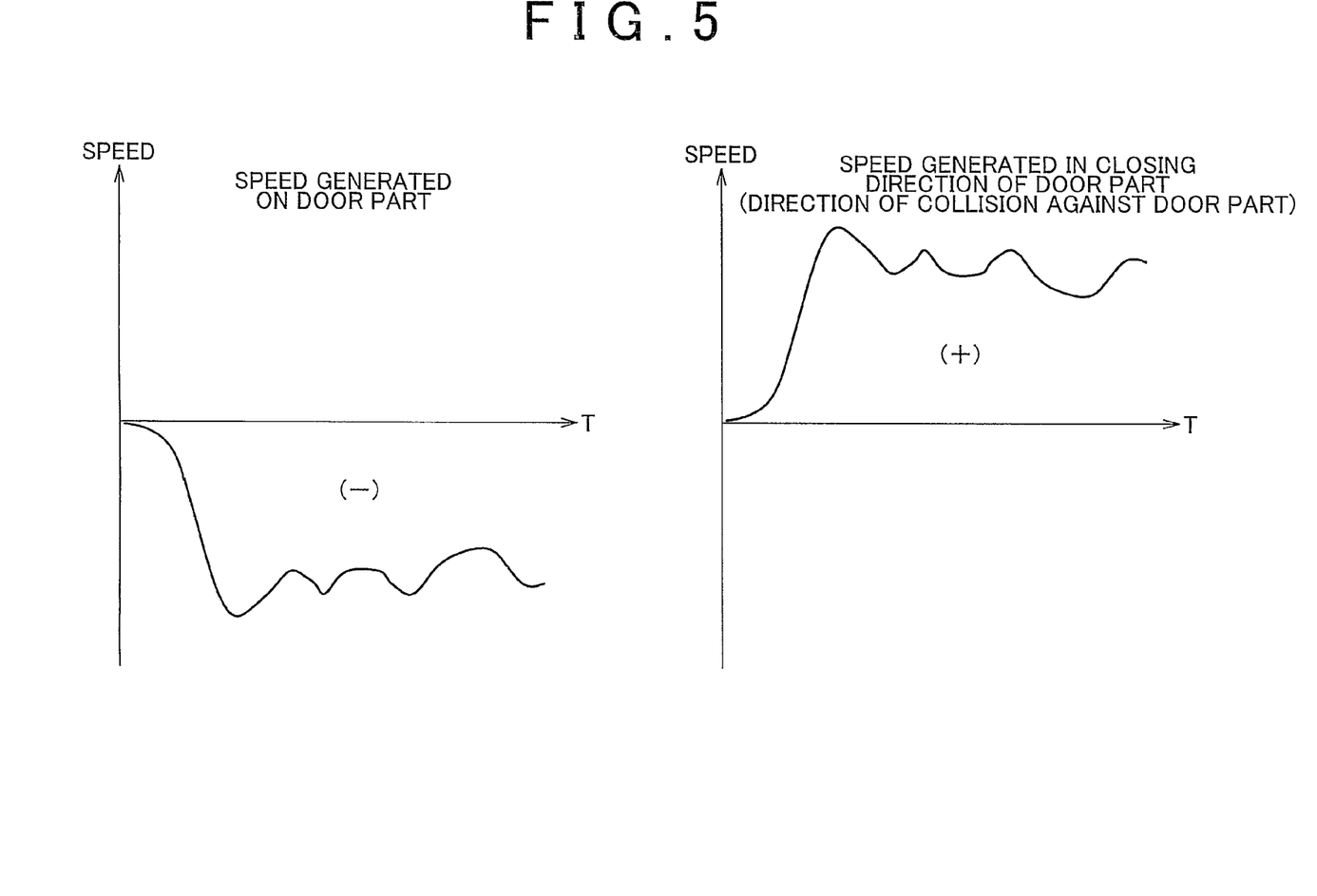
FIG. 5 is a graph showing the speed generated on the door part and the speed that should be generated when a collision occurs against the door part.

Here, as shown in FIG. 5, the polarity of the speed generated on the door part is a negative polarity that is inverted relative to a positive polarity of the speed that should be generated in the closing direction of the door part. Specifically, this means that the door part is closed with strong force. At this moment, the controller 202 prohibits actuation of the occupant protection part 203 based on the result of determination that is carried out by the collision determination part 102 when no collision has occurred.

When, on the other hand, it is determined in step S204 that the polarity of the speed generated on the door part is not inverted, the collision determination part 102 determines that the occurrence of a collision against the door part from the outside (step S206). At this moment, the controller 202 actuates the occupant protection part 203 based on the result of determination that is carried out by the collision determination part 102 when the collision has occurred.

Figure 6:
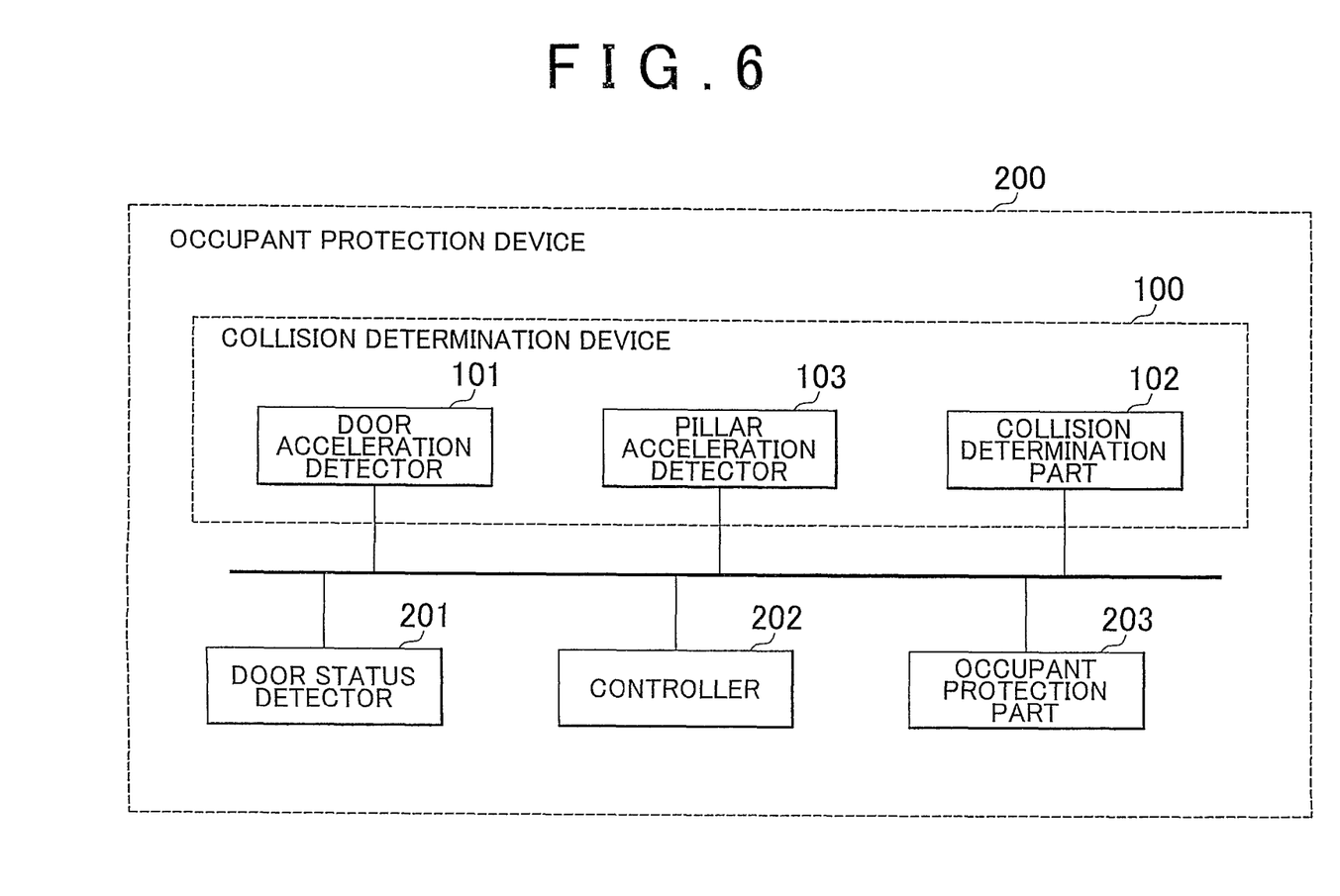
FIG. 6 is a block diagram showing the entire configuration of an occupant protection device to which a collision determination device according to a second embodiment of the invention is applied.

Hereinafter, a collision determination device according to a second embodiment of the invention and an occupant protection device are described in detail with reference to the drawings. The configuration of this embodiment is different from that of the first embodiment in that this embodiment further has a pillar acceleration detector 103 that is provided in a pillar part adjacent to the door part of the vehicle and detects an acceleration of a predetermined value or more generated in this pillar part, as well as the direction of this acceleration (see FIG. 6). When the door part is closed with strong force, the direction of the acceleration detected by this pillar acceleration detector 103 corresponds to the closing direction of the door part, i.e., the direction of an acceleration that is generated when a collision has occurred against the door part from the outside.

Figure 7:
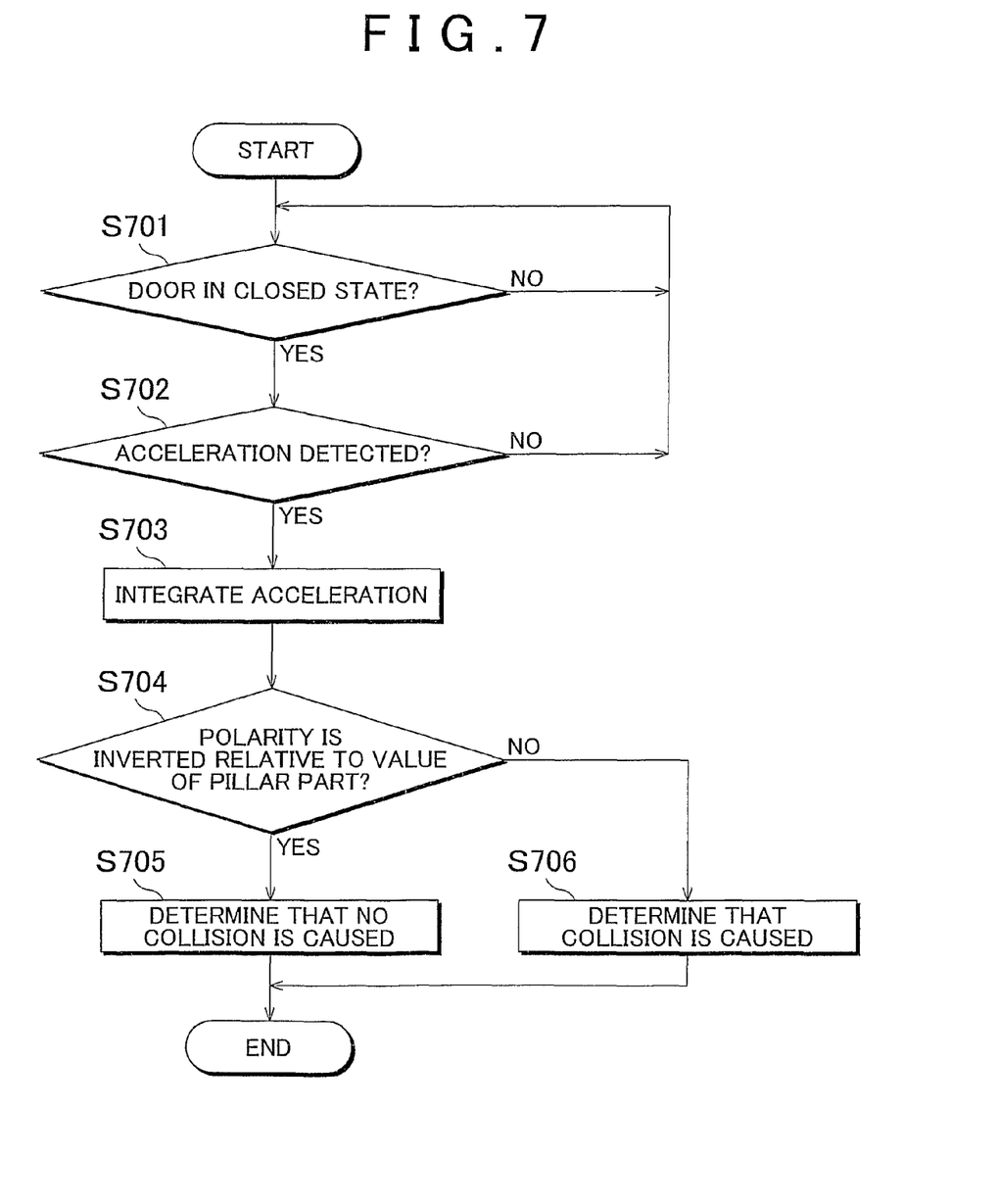
FIG. 7 is a flowchart showing the operations of the collision determination device and the occupant protection device according to the second embodiment of the invention.

Hereinafter, the operations of the collision determination device according to the second embodiment of this invention and of the occupant protection device are described with reference to the flowchart shown in FIG. 7.

First, the door status detector 201 determines whether the door part is in the closed state (step S701). Here, when the door switch is ON it is determined that the door part is in the closed state, and when the door switch is OFF it is determined that the door part is in the open state.

When it is determined in step S701 that the door part is not in the closed state, the door status detector 201 awaits there.

When, on the other hand, it is determined in step S701 that the door part is in the closed state, the collision determination part 102 determines whether the door acceleration detector 101 detects an acceleration of a predetermined value or more (step S702). The predetermined value here is a value of an acceleration that is normally generated on the door part when, for example, opening or closing the door part. When the acceleration of the predetermined value or more is generated, it means either the door part is closed with strong force or a collision has occurred against the door part from the outside.

When it is determined in step S702 that the acceleration of the predetermined value or more is not detected, the collision determination part 102 awaits there.

When, on the other hand, it is determined in step S702 that the acceleration of the predetermined value or more is detected, the collision determination part 102 integrates the value of the acceleration of the predetermined value or more, which is detected by the door acceleration detector 101, and the value of an acceleration of a predetermined value or more, which is detected by the pillar acceleration detector 103, for a predetermined period of time (step S703).

Next, the collision determination part 102 determines whether a polarity of the speed that is obtained from the integration in step S703 and generated on the door part is inverted relative to a polarity of the speed generated in the closing direction of the door part, i.e., the speed generated on the pillar part (step S704).

Figure 8:
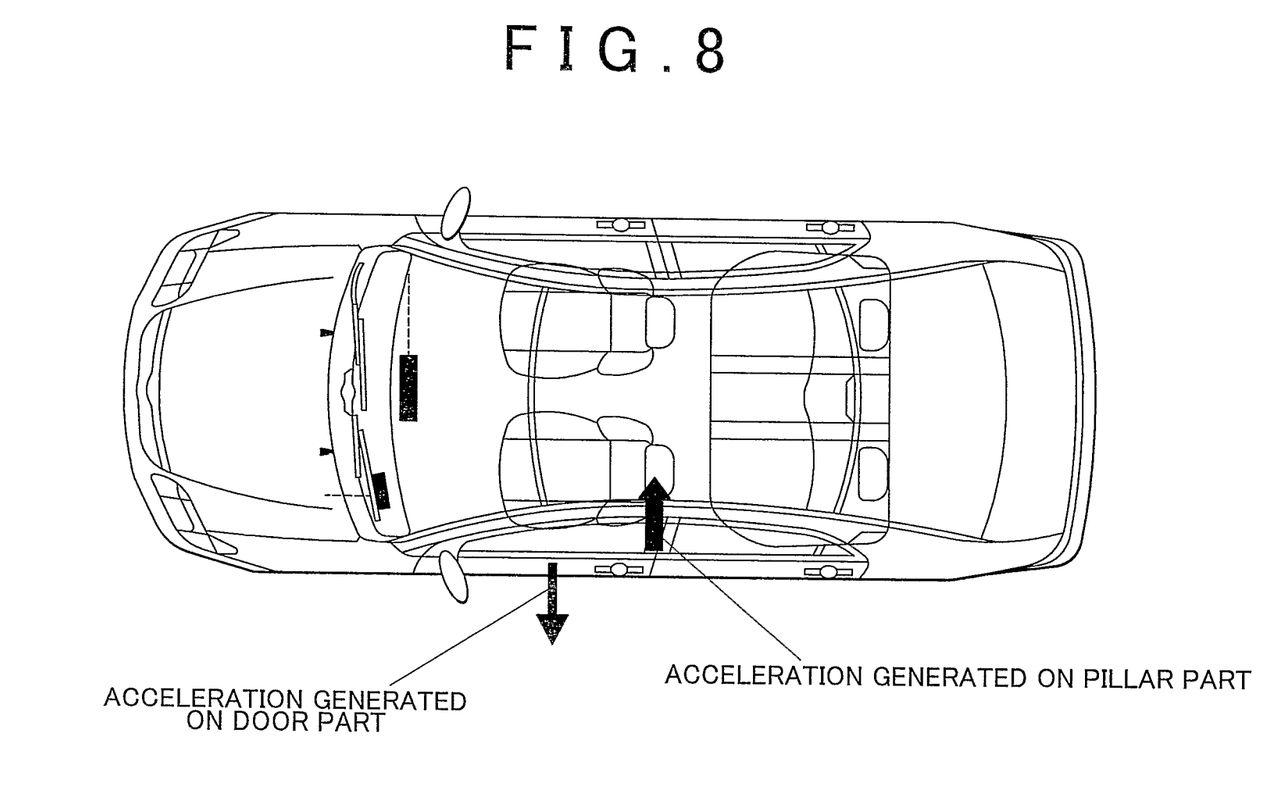
FIG. 8 is a schematic diagram showing an acceleration generated on a door part and an acceleration generated on a pillar part.
Figure 9:
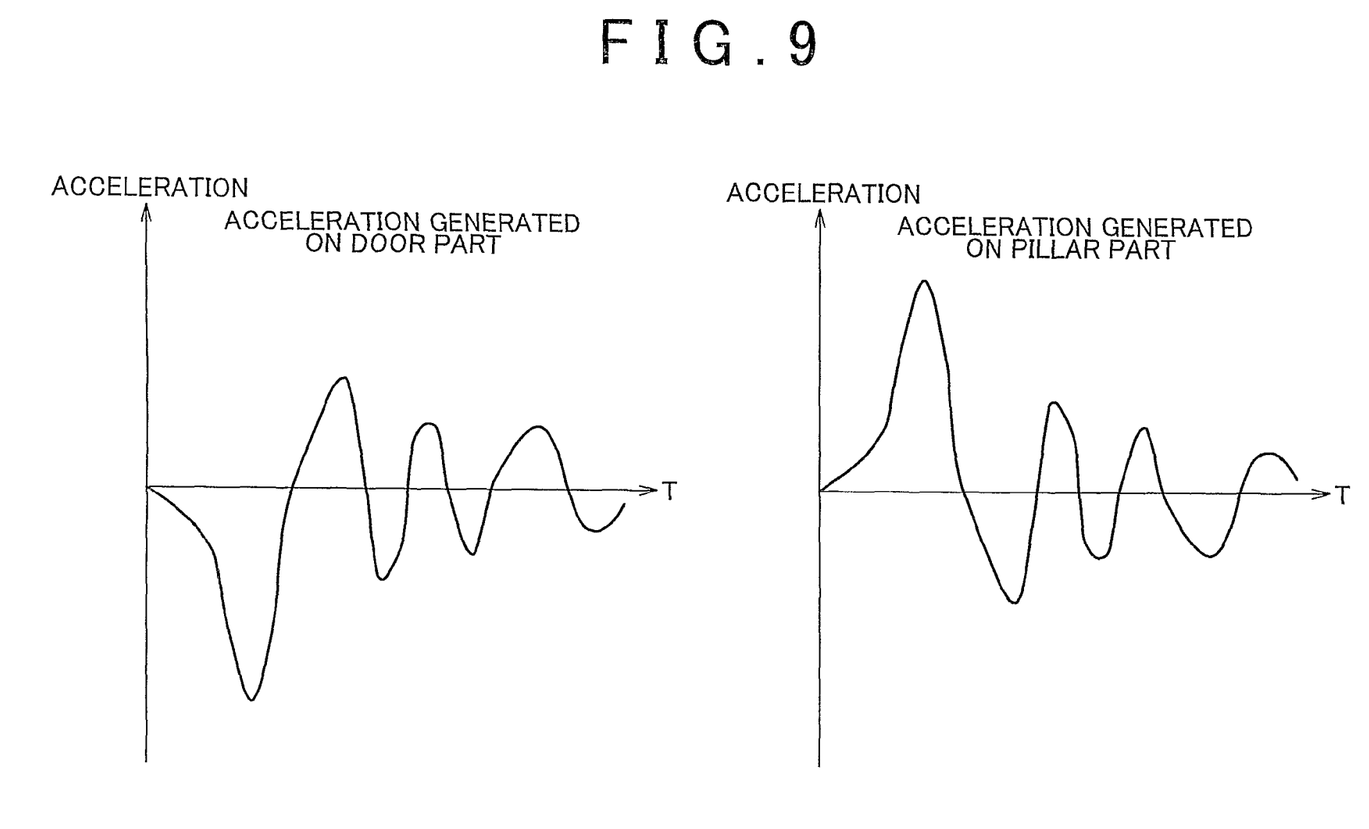
FIG. 9 is a graph showing an acceleration generated on the door part and an acceleration generated on the pillar part.

When it is determined in step S704 that the polarity of the speed generated on the door part is inverted, the collision determination part 102 determines that no collision has occurred against the door part from the outside (step S705). At this moment, the direction of the acceleration generated on the door part is a direction that is inverted relative to the direction of collision against the door part from the outside, i.e., the direction of the acceleration generated on the pillar part, as shown in FIGS. 8 and 9.

Figure 10:
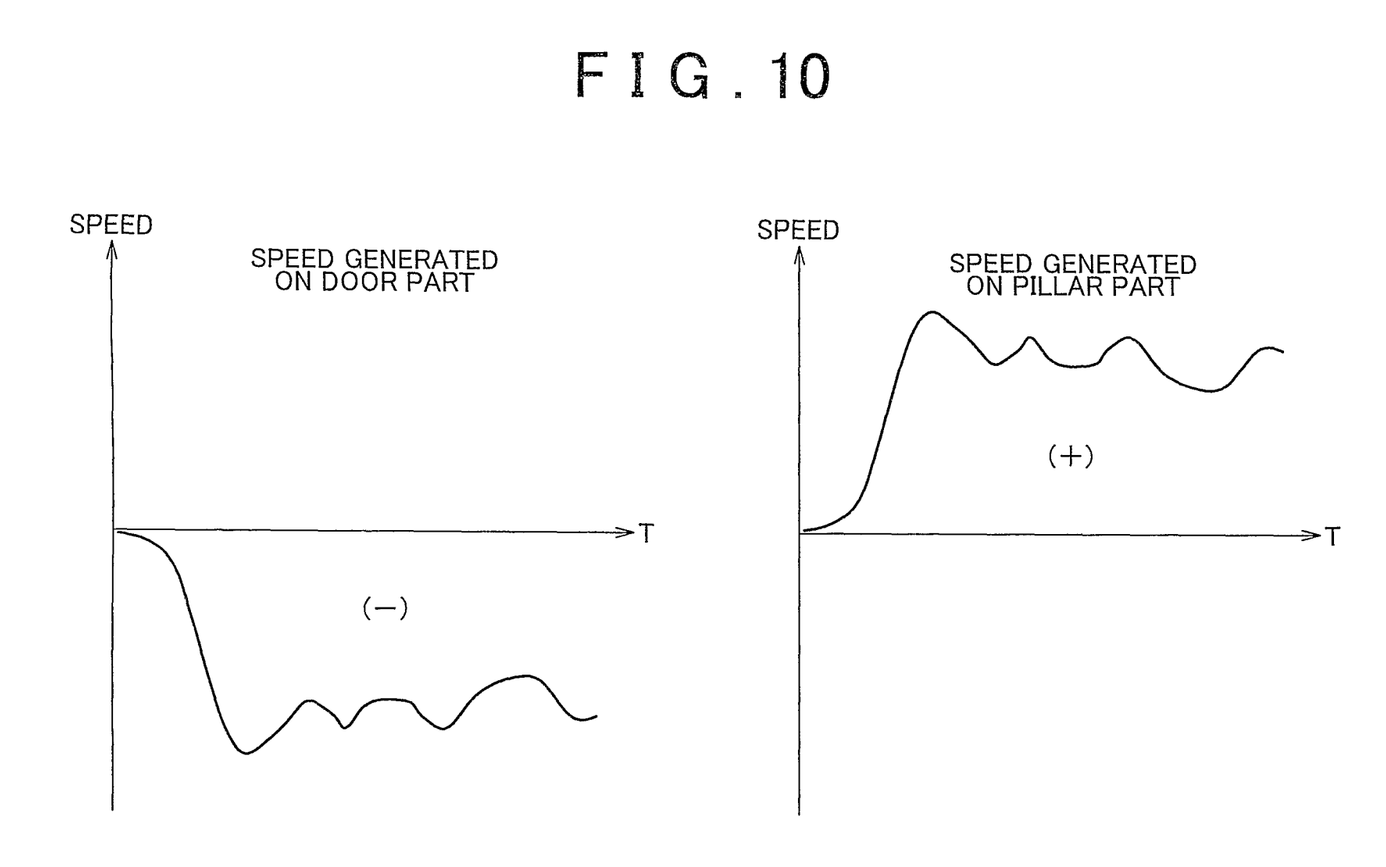
FIG. 10 is a graph showing the speed generated on the door part and the speed generated on the pillar part.

Here, as shown in FIG. 10, the polarity of the speed generated on the door part is a negative polarity that is inverted relative to a positive polarity of the speed generated on the pillar part. Specifically, this means that the door part is closed with strong force. At this moment, the controller 202 prohibits actuation of the occupant protection part 203 based on the result of determination that is carried out by the collision determination part 102 when no collision has occurred.

When, on the other hand, it is determined in step S704 that the polarity of the speed generated on the door part is not inverted, the collision determination part 102 determines that a collision has occurred against the door part from the outside (step S706). At this moment, the controller 202 actuates the occupant protection part 203 based on the result of determination that is carried out by the collision determination part 102 when the collision has occurred.

In the first and second embodiments, a determination is made as to whether a collision has occurred against the door part from the outside, based on the polarity of the value that is obtained by integrating the acceleration of the predetermined value or more on the door part for a predetermined period of time. However, a determination may be made as to whether a collision has occurred against the door part from the outside, based on the polarity of a peak value of the acceleration of the predetermined value or more that is generated on the door part.

In this case, when the polarity of the peak value of the acceleration of the predetermined value or more that is generated on the door part is inverted relative to the polarity of a peak value of the acceleration that should be generated in the closing direction of the door part, i.e., the direction of collision against the door part from the outside, it is determined that no collision has occurred against the door part from the outside. Moreover, when the polarity of the peak value of the acceleration of the predetermined value or more that is generated on the door part is inverted relative to the polarity of the peak value of the acceleration generated on the pillar part, it is determined that no collision has occurred against the door part from the outside.

Note in the embodiments described above that, when a lock of the door part is released, it may be determined that no collision has occurred against the door part from the outside.

As described above, this invention can provide a collision determination device and an occupant protection device for reliably determining the occurrence of a collision against a door part from the outside and preventing erroneous determination on the occurrence of a collision against the door part from the outside.

The configurations described in the above embodiments are merely intended to illustrate specific examples and not to limit the technical scope of the invention of the present application. Any configurations can be adopted within a scope in which the effects of the present application are achieved.

Further, instead of determining that no collision has occurred against the door part from the outside, the door acceleration detector may output a value obtained by reducing an acceleration acting in the closing direction of the door part among accelerations detected by the acceleration detector.

The invention claimed is:

1. A collision determination device for determining occurrence of a collision against a door part of a vehicle, the collision determination device comprising:
   a door acceleration detector, integrated with the door part of the vehicle, that detects an acceleration generated on the door part of the vehicle and a direction of the acceleration; and
   a collision determination part that determines that no collision has occurred against the door part from an outside in response to detecting that the direction of the acceleration is an opening direction of the door part by the door acceleration detector based on a polarity of a value that is obtained by integrating the acceleration detected by the door acceleration detector for a predetermined period of time being inverted relative to a polarity of an acceleration obtained when a collision has occurred against the door part from the outside, and that determines that the collision has occurred against the door part from the outside, when the direction of the acceleration detected by the door acceleration detector is a closing direction of the door part, based on the polarity of the value being noninverted relative to the polarity of the acceleration obtained when the collision has occurred against the door part from the outside.

2. The collision determination device according to claim 1, wherein the collision determination part determines that the direction of the acceleration detected by the door acceleration detector is the opening direction of the door part, when a polarity of a peak value of the acceleration detected by the door acceleration detector is inverted relative to a polarity of a peak value of an acceleration obtained when a collision has occurred against the door part from the outside.

3. The collision determination device according to claim 1, further comprising:
   a pillar acceleration detector that detects an acceleration generated on a pillar part of the vehicle adjacent to the door part and a direction of the acceleration generated on the pillar part, wherein
   the collision determination part determines that the direction of the acceleration detected by the door acceleration detector is the opening direction of the door part, when a polarity of the acceleration detected by the door acceleration detector is inverted relative to a polarity of the acceleration detected by the pillar acceleration detector.

4. The collision determination device according to claim 1, wherein the collision determination part does not perform collision determination for determining the occurrence of a collision against the door part, when a lock of the door part of the vehicle is released.

5. The collision determination device according to claim 1, wherein the door acceleration detector outputs a value obtained by reducing an acceleration acting in the closing direction of the door part.

6. The collision determination device according to claim 1, further comprising:
   a door status detector that determines whether the door part is in an open state or a closed state, and
   the door acceleration detector detects the acceleration generated on the door part of the vehicle and the direction of the acceleration after the door status detector determines that the door part is in the closed state.

7. An occupant protection device for a vehicle, which protects an occupant from a collision against a door part of a vehicle from an outside, the occupant protection device comprising:
   an occupant protection part that protects the occupant of the vehicle;
   a door acceleration detector, integrated with the door part of the vehicle, that detects an acceleration generated on the door part and a direction of the acceleration;
   a collision determination part that determines that no collision has occurred against the door part from the outside in response to detecting that the direction of the acceleration is an opening direction of the door part by the door acceleration detector based on a polarity of a value that is obtained by integrating the acceleration detected by the door acceleration detector for a predetermined period of time being inverted relative to a polarity of an acceleration obtained when a collision has occurred against the door part from the outside, and that determines that the collision has occurred against the door part from the outside, when the direction of the acceleration detected by the door acceleration detector is a closing direction of the door part, based on the polarity of the value being noninverted relative to the polarity of the acceleration obtained when the collision has occurred against the door part from the outside; and
   an occupant protection actuation prohibiting part that prohibits actuation of the occupant protection part when the collision determination part determines that no collision has occurred against the door part from the outside.

8. The occupant protection device according to claim 7, wherein the collision determination part determines that the direction of the acceleration detected by the door acceleration detector is the opening direction of the door part, when a polarity of a peak value of the acceleration detected by the door acceleration detector is inverted relative to a polarity of a peak value of the acceleration obtained when a collision has occurred against the door part from the outside.

9. The occupant protection device according to claim 7, further comprising:
- a pillar acceleration detector that detects an acceleration generated on a pillar part of the vehicle adjacent to the door part and a direction of the acceleration generated on the pillar part, wherein
- the collision determination part determines that the direction of the acceleration detected by the door acceleration detector is the opening direction of the door part, when a polarity of the acceleration detected by the door acceleration detector is inverted relative to a polarity of the acceleration detected by the pillar acceleration detector.

10. The occupant protection device according to claim 7, wherein the collision determination part does not perform collision determination for determining the occurrence of a collision against the door part, when a lock of the door part of the vehicle is released.

11. The occupant protection device according to claim 7, wherein the door acceleration detector outputs a value obtained by reducing an acceleration acting in the closing direction of the door part.

12. A collision determination method for determining occurrence of a collision against a door part of a vehicle, the collision determination method comprising:
- detecting an acceleration generated on the door part and a direction of the acceleration;
- determining that no collision has occurred against the door part from an outside in response to detecting that the direction of the acceleration is an opening direction of the door part based on a polarity of a value that is obtained by integrating the detected acceleration for a predetermined period of time being inverted relative to a polarity of an acceleration obtained when a collision has occurred against the door part from the outside; and
- determining that the collision has occurred against the door part from the outside, when the direction of the detected acceleration is a closing direction of the door part, based on the polarity of the value being noninverted relative to the polarity of the acceleration obtained when the collision has occurred against the door part from the outside.

* * * * *